March 31, 1964

W. A. TOTO

3,127,467

WELDING CABLE ASSEMBLY

Filed April 13, 1962

INVENTOR
William A. Toto

BY Abraham A. Saffitz
ATTORNEY

March 31, 1964 W. A. TOTO 3,127,467
WELDING CABLE ASSEMBLY
Filed April 13, 1962 5 Sheets-Sheet 2

INVENTOR.
William A. Toto
BY
Abraham A. Saffitz
ATTORNEY

March 31, 1964 W. A. TOTO 3,127,467
WELDING CABLE ASSEMBLY
Filed April 13, 1962 5 Sheets-Sheet 4

INVENTOR
William A. Toto
BY Abraham A. Saffitz
ATTORNEY

March 31, 1964    W. A. TOTO    3,127,467
WELDING CABLE ASSEMBLY

Filed April 13, 1962    5 Sheets-Sheet 5

INVENTOR
William A. Toto
BY Abraham A. Saffitz
ATTORNEY

United States Patent Office 3,127,467
Patented Mar. 31, 1964

3,127,467
WELDING CABLE ASSEMBLY
William A. Toto, 3645 Warrensville Center Road,
Cleveland 22, Ohio
Filed Apr. 13, 1962, Ser. No. 187,302
5 Claims. (Cl. 174—15)

This invention relates to a multiple conductor unit cable terminal and particularly to a unit cable terminal for use with multiple conductor lead cables, wherein the cable conductors of each polarity are provided with a novel end structure particularly adapted to cooperate and coact with novel mating terminal end structure so as to be readily detachable for salvaging or easy replacement of pitted terminals by the user of the cables in his own plant.

The cable terminal of this invention is specifically intended to be used in connection with kickless cable of the type described and claimed in U.S. Patents No. 2,320,470 to M. G. Rees and No. 2,308,673 to L. S. Burgett wherein multiple strand cable lead conductors are alternately spaced on a circle about the longitudinal axis of the cable incorporating inner and outer non-conductive enclosing sheaths adapted to internally separate the conductors of opposite polarity, to provide an outer cover for the cable structure and to provide fluid conduits for the cooling medium, such structure per se being well-known in the art. Although the following description is limited to the Rees cable this type of terminal can be used with a variety of cable cross sectional configuration utilizing any two groups of opposite polarity strands separated by any diametrically positioned flexible insulating strip.

Moreover, the terminal of this invention and its associated structure is particularly adapted for use in conjunction with resistance welding applications wherein very high amperage, low voltage current is normally used.

Electrical resistance welding is an important cog in modern mass production of automobiles and appliances and other areas of fabrication where the jointing of metal sheets is accomplished along a moving production line. Generally portable welding guns are suspended along side the moving line to permit operators to maneuver the welding guns about the unit being assembled. The welding gun is supplied with high currents of 6,000 to 35,000 amperes as 3 to 10 volts from the overhead transformer by a flexible two lead water cooled self-contained cable generally 6 to 10 feet in length.

In the early stages of the art, it was common practice to use two separate water cooled cables strapped together to provide the complete circuit for conveying the welding current.

This type of installation resulted in severe operator fatigue caused by their rigid bulky mass, and the large inductive reactive forces produced by the heavy currents and the relatively large spacing between the two separate cables. The inductive reactance (X) between parallel conductors is a function of the alternating current frequency, and the logarithm of the ratio of conductor diameters to distance between their centers as given by the well known power transmission equation:

$$X = \frac{Z\pi f}{5280}\left(80 - 741.1 \log_{10} \frac{D-r}{r}\right) \text{ohms per foot}$$

To minimize this reactive fatiguing force ("kick") and increase the flexibility of these cables there has been developed a single cooling jacket for encasing both the negative conductors and the positive conductors. As in the case of the common six conductor cable, three positive lead cables alternate with three negative lead cables, and are helically wound down the cable length to provide the so-called "kiskless" or low reactance level type of cable.

The main objectives for cable performance in electrical resistance welding are the same today as it was with the early cable types that were developed prior to 1945 and are used so extensively in the automobile industry. Even though great improvements have been made, the cables of today are still too heavy, too bulky, too expensive, and have insufficient service life under heavy duty conditions. To better meet these modern production requirements there have been continuous and substantial efforts put forth to minimize the aforementioned difficulties. It has been recognized that one of the major difficulties resides in the terminal head structure and in the method by which the cable leads are attached to the terminals. Substantially all mechanical failures in service occur in this part of the welding cable assembly. This problem is emphasized by the following patents: 2,308,673; 2,702,311; 2,943,133. Each of them are examples of the efforts of inventors to overcome the problems of joining the cable leads to the terminals. It has therefore been long recognized that the means of connecting the cable strands at the rearward end of the terminal is of major importance in fulfilling the severe requirements imposed on welding cables used in high production systems where the dependability of production equipment is a vital necessity.

It is common manufacturing practice to join the cable conductor leads to the separate terminal elements by soldering or by a combination of clamping and soldering. Each cable lead consists of a large number of fine copper wires which are inherently susceptible to work-hardening, and to embrittlement by heat. The fine wires making up the cable strands are thusly subjected to excessively high temperatures during the fusion process causing embrittlement to the strands, and thereby reducing their mechanical strength at the soldered area.

Accordingly, the newly manufactured cable in the prior art is already weakened at its critical connecting point to the terminal due to metallurgical changes by heating and work-hardening. Aggravating this weakening, during its usage the welding cable is often used as a tow rope to pull the heavy transformer suspended overhead along the moving production line while the welding is being accomplished on the moving unit being assembled. Further, in use the cable heats up readily so that cable failure at the cable end structure due to fracturing of the fine wires occurs more readily because they were pre-weakened in their assembly. The cable breakdown process is further accelerated by the extreme mechanical flexing required in usage and the high inductive reactive forces ("kick") when the cable is carrying heavy currents, during welding periods.

In the early art of cable terminal devolpment, all the terminals were relatively complicated and expensive structures which were designed to bring together the bulky multi-strand windings of the cable into spaced apart relationship rather than a small volume compact unit. One example of the more recent compact unit type construction is found in U.S. patent to Botterill, No. 2,702,311, who has departed from the early concept exemplified by Rees in U.S. Patent No. 2,320,470. Botterill has brought together groups of cable windings of the same polarity and solder-joined them into a small but intricately machined terminal.

In U.S. patent to Botterill, No. 2,702,311, the six cable conductors are brought together in two pairs of threes, an outer pair of three in three-way apertured and spaced apart extensions from the end terminal itself and the inner pair in a clover leaf which fits in concentric and interlocking fashion within the outer apertures. Each cusp of the cloverleaf encloses a separate soldered cable conductor. Essentially Botterill soldered each end of the conductors of one group in a male structure and has soldered the ends of another group in a female three-holed sleeve. Each sleeve is integral with one of the split terminal halves. The six cable conductors are securely soldered into their respective apertures in order to achieve conductivity through the joint.

Although the very expensive one-piece combined terminal and cable end structure of Botterill does improve the service life of the liquid cooled cable, no provision is made to eliminate the wire embrittlement during the soldering process of the breaking of fine wires when the cable is severely bent or flexed at the area of the soldered joint. When the strands become broken or burned during heavy duty conditions, repair or rebuilding of the cable must usually be done at the cable manufacturer's factory, due to the difficult procedure of assembling the terminals to the cable. In addition to the repair and freight charges the user is then deprived of the usage of the cables for several weeks while it is away from his plant for repairs.

The present invention completely eliminates the disadvantages of the cable integral with the massive terminal as taught in the Botterill patent and provides a purely mechanical attachable conductor end fitting for multiple strand lead cables of the kickless type and for the first time permits the user to easily salvage, replace, and repair cables in his own plant.

It is an object of this invention to provide an electrical resistance welding cable assembly wherein the cable to terminal joint is mechanically sound, electrically efficient and wherein the terminals may be removably secured to the cable conductors by means of removable mechanical fasteners.

It is another object of this invention to provide a resistance welding cable assembly wherein the terminal elements may be detachably secured to the cable conductors by means of a unique arrangement whereby the terminal to cable joint presents a substantially smooth, uniform outer surface for accommodating a removable outer protective sheath.

Other objects of the invention will in part be obvious. For a fuller understanding of the nature and objects of the invention, reference is made to the following detailed description taken together with the accompanying drawings in which:

FIG. 2 is a fragmentary isometric view with parts broken away of a preferred embodiment of the flexible cable end fitting and mating terminal tongue construction of the present invention used with one type of liquid cooled cable.

FIG. 6 is a vertical sectional view taken substantially on the line 6—6 of FIG. 5;

FIG. 7 is a vertical sectional view taken substantially on the line 7—7 of FIG. 5;

FIG. 11 is a fragmentary exploded perspective view of an alternate embodiment of the cable conductor end fitting and terminal tongue construction.

FIG. 13 is a fragmentary exploded perspective view of another embodiment of the cable conductor end fitting and terminal tongue construction, and, FIG. 14 is a fragmentary exploded perspective view of still another embodiment of the cable conductor end fitting and terminal tongue construction.

Figure 1:
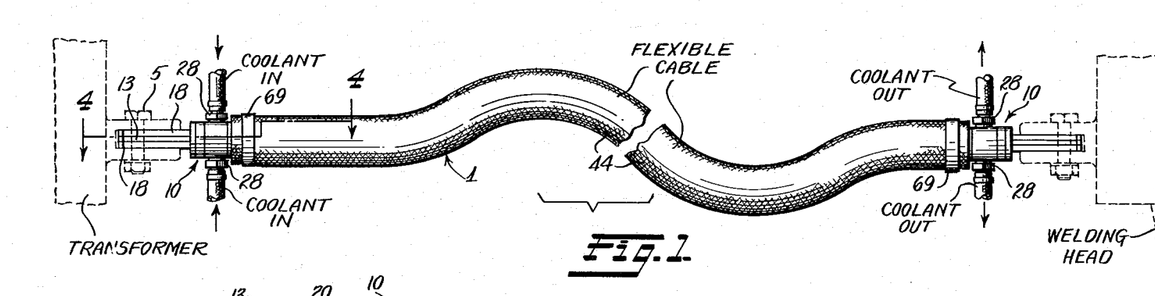
FIG. 1 is a fragmentary diagrammatic view of the flexible liquid cooled cable of my present invention.

The flexible, water-cooled welding cable assembly embodying the preferred terminal structure of this invention is shown in its usual environment in FIG. 1 between a transformer and a welding head. As indicated, coolant is supplied at the transformer end of the cable as shown, flows through the cable and out thereof at the welding head end. The cable assembly as seen in FIG. 2 generally comprises two groups 46, 47 of elongated cable conductors secured at their opposite end portions (as shown in FIG. 1) to terminals 10. Each group of cable conductors is of single polarity as is usual in this type of cable construction.

As shown in more detail in FIGS. 2, 3, 4 and 5, the cable terminal of the preferred embodiment of this invention is generally indicated at 10, and is a double polarity terminal comprising a pair of semicylindrical, elongated terminal conductor elements 12 identical in form and joined together along their inner flat surfaces in non-conductive relation. A relatively thin flat insulating element 13 maintains the conductors 12 electrically insulated from each other along their joint faces. It is to be understood that although the terminal 10 is shown and described as being of double polarity with two conductors 12, since this is the usual type of terminal structure desired in practice, the terminal could just as well be of any number of conductors arranged about a central axis and mutually insulated from one another by insulating means which are known.

Terminal conductor elements 12 in the illustrated embodiment are held together in unitary relationship by suitable means. As shown best in FIGS. 3 and 5 there is employed a lightweight reinforced plastic non-conductive molded sleeve 14 disposed in peripheral grooves 16 provided in the surfaces of conductors 12 for this purpose. Hose barbs 19 are formed integrally on the molded sleeve 14 to accommodate the outer sheath of the conductor cable as will be more particularly described below. Of course, it is not necessary to use a molded sleeve such as 14 to retain the conductors in assembled relation, and a mechanical fastener (not shown) of any suitable type which is known could be used. In such case, grooves 16 would be eliminated from the conductor structure and hose barbs 19 would be provided in the surface of the conductor material of the terminal.

As seen in FIG. 2, the head end of each of the terminal conductors 12 is shown in the illustrated embodiment as being in the form of flat projections 18 generally rectangular in transverse cross section. Cable terminals 10 are fastened to the transformer output lugs and to the welding head by means of a sturdy bolt 5 passing through aperture 20 which extends transversely through the projection 18 of each conductor 12 of the terminal. It is to be understood that the head end of the terminal 10 may be formed in any manner to accommodate output leads to welding guns and transformers and that the particular configuration shown and described is exemplary only.

Figure 4:
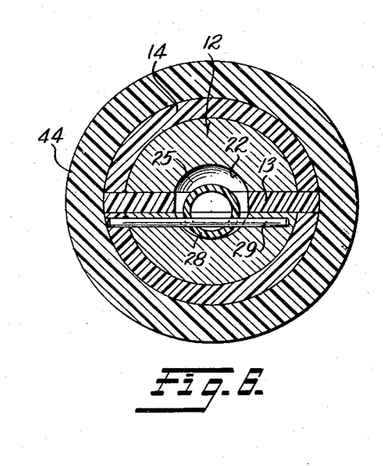
FIG. 4 is an enlarged fragmentary horizontal sectional view taken substantially on line 4—4 of FIG. 1.
Figure 5:
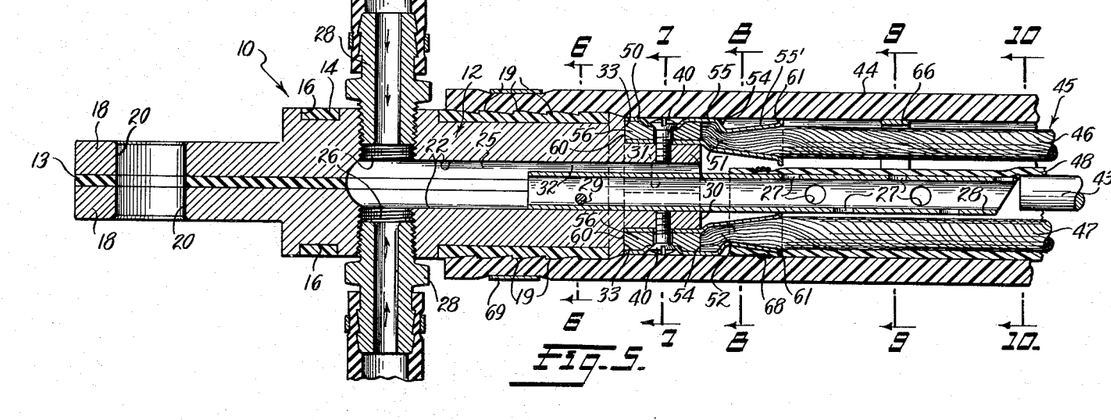
FIG. 5 is a fragmentary vertical sectional view taken substantially on line 5—5 of FIG. 3.

As best seen in FIGS. 4 and 5, the interior faces of the conductors 12 may be provided with axial grooves or channels 22 and the insulating sheet 13 may be removed from this area to provide an open interior passageway or chamber 25 within the joined conductors 12. Coolant ports 26 are provided in each of the conductor elements 12, the ports 26 being in communication with the exterior chamber 25. Coolant fluid may be delivered to the terminal by conduit means (not shown) attached to hose fittings 28 threaded or otherwise secured in a fluid tight manner within ports 26.

A resilient, yet relatively unyielding, fluid carrying and proportioning tube 28 having apertures 27 may be disposed within the chamber 25 and fixedly secured within a groove 22 of one of the conductors 12 such as by means of a transverse pin element 29, as best seen in FIG. 6. Tube 28 is dimensioned so as to allow a free area between its diameter and the interior side walls of the chamber 25, and is of suitable length so as to extend rearwardly beyond the cable connecting end of the terminal a suitable distance for reasons which will become apparent below.

It is to be understood that if cooling is not to be used, ports 26, chamber 25, and tube 28 could be omitted from the terminal structure.

Figure 3:
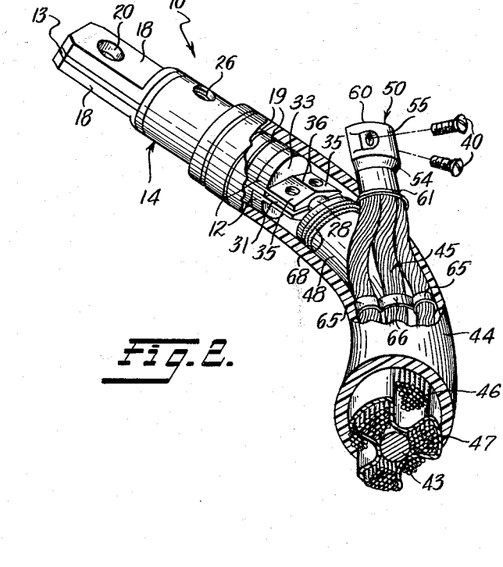
FIG. 3 is an enlarged exploded isometric view of the terminal and conductor end fitting of the preferred embodiment.
Figures 11, 13, 14:
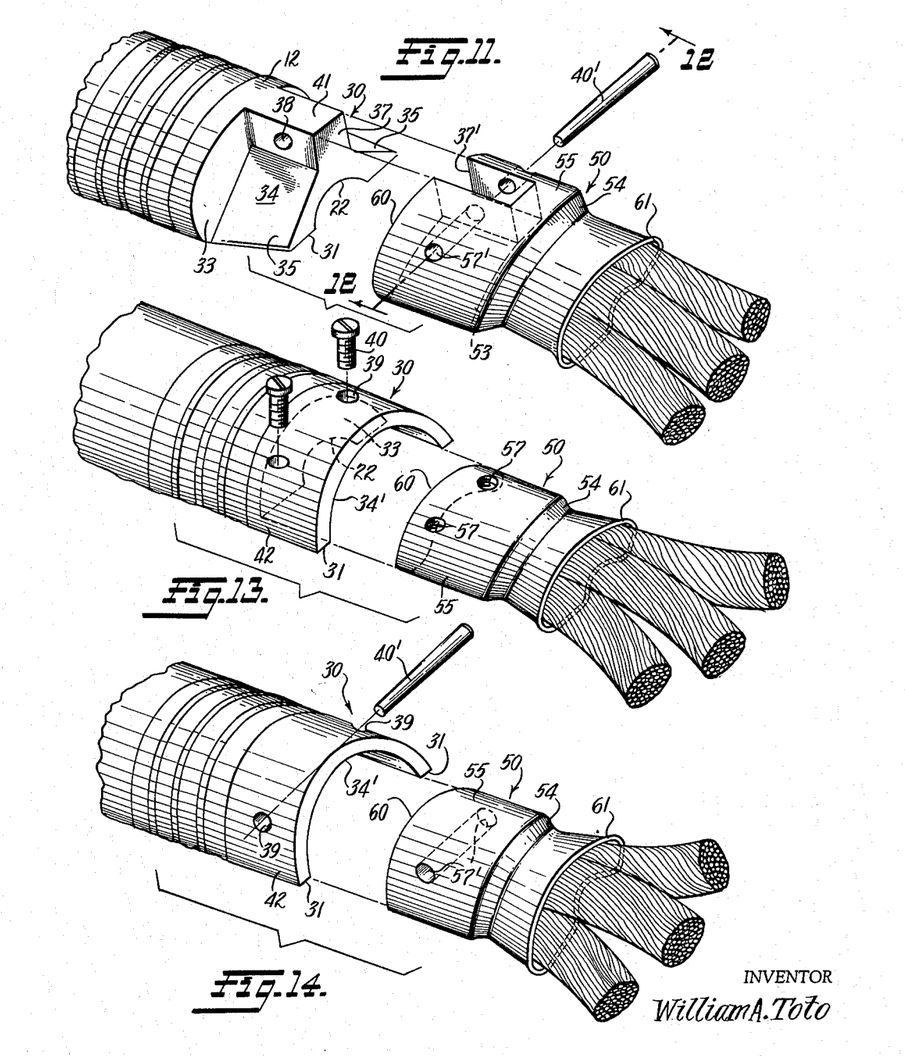

In the preferred embodiment as shown by FIGS. 2 and 3 and in the embodiments as shown by FIGS. 11, 13, and 14, the rearward end of each terminal conductor 12 is radially undercut to form an axially projecting tongue element 30 which is integral with the body of conductor 12. The tongue element 30 of each embodiment is adapted to receive thereon in mating arrangement a cable conductor end fitting 50 which will be described more specifically below. Suffice it to say for the moment that the term "cable conductor end fitting receiving surface," when used in reference to the tongue element 30 of terminal conductors 12, refers to that surface of tongue 30 which is adapted to mate with the conductor end fitting 50 when the conductor end fitting 50 is assembled to the terminal conductor 12.

It will be noted that the tongue projection 30 is formed in each instance so as to have a cross section of lesser area than the cross-sectional area of conductor body 12 adjacent the tongue 30. Accordingly, in each instance there is provided a substantially planar radial surface area 33 of conductor body 12 which is exposed, and which lies in a radial plane substantially normal to the longitudinal axis of terminal conductor 12. Although each tongue projection 30 of each terminal conductor 12 is formed so as to have a cross-sectional area less than that of the conductor 12, it is to be observed that the transverse width of the tongue 30 as taken across its widest dimension substantially corresponds to the diametric width of each conductor 12 from which it projects, or can be tapered accordingly when a greater quantity of water is desired to be passed over the outer strands of the cable.

In each embodiment of tongue 30, the tongue includes a generally planar inner surface 31 having the groove 22 of conductor 12 extending longitudinally across it to allow accommodation of proportioner tube 28 and of cooling fluid when the terminal conductors are joined as shown in FIG. 3.

It will be noted that when the terminal 10 is assembled, the surfaces 31 of the tongues 30 are spaced apart as indicated by 32. If the terminal is fluid cooled, the space 32 between the tongue elements 30 may be left open to allow free circulation of cooling fluid between the surfaces 31, or, if desired, insulation material 13 between conductors 12 may be extended into space 32, particularly if the terminal is not fluid cooled.

In the preferred embodiment of FIGS. 2–5, each tongue element 30 is provided with a cable conductor end fitting receiving outer surface 34 that may be generally conical in form, comprising planar apexed surface areas 35 meeting at an apex line 36 parallel to but spaced outwardly from the longitudinal axis of each conductor 12. The apexed form of outer surface 34 preserves the structural integrity of the tongue projection 30 and presents a large surface area for accommodating the end fitting 50 to form a low resistance joint. The surface areas 35 of each tongue 30 are moreover provided with suitable threaded apertures 39 extending into the surfaces at right angles with respect thereto, and adapted to receive a mechanical fastener such as a threaded screw 40 which removably retains a cable conductor end fitting 50 to the tongue element 30 in mating assembled conductive relation in a manner to be more fully described below.

In the embodiment shown by FIG. 11, the tongue projection 30 of each terminal conductor element 12 is generally Y-shaped, with the branches of the Y form extending inwardly towards the flat inner surface of the terminal conductor 12, and the central leg 37 of the Y being disposed radially and centrally relative to the rearward portion thereof. In this instance the outer surfaces 35 of the tongue projection 30 follow the contour of the Y form. The section 37 of tongue 30 in this instance has an outer surface 41 corresponding in curvature to the outer peripheral curvature of the body of conductor 12 adjacent the tongue 30. Section 37 of tongue 30 is provided with a transverse fastener receiving aperture 38 adapted to receive a tapered pin type fastener 40′ adapted to removably retain a cable conductor end fitting 50 in mated, assembled, conductive relation to the tongue 30 as will be more fully described below.

In the embodiment shown by FIG. 13, tongue element 30 of a conductor 12 is formed as a section of a cylinder wall of substantially uniform cross section, the outer surface 42 thereof corresponding in curvature to that of the body of conductor 12 adjacent the tongue section 30, and the inner surface 34′ thereof comprising a generally arcuate cable conductor end fitting receiving surface. The tongue 30 in this instance can be formed as by undercutting the rearward portion of terminal conductor 12 radially outwardly from the inner flat surfaces thereof until the desired cylindrical section is left projecting from the terminal conductor. Tongue element 30 is provided with fastener receiving apertures 39 adapted to receive suitable mechanical fastener means such as threaded screw 40 for removably retaining a cable conductor end fitting in mating, assembled conductive relation to tongue 30 as will be described below.

Figure 9:
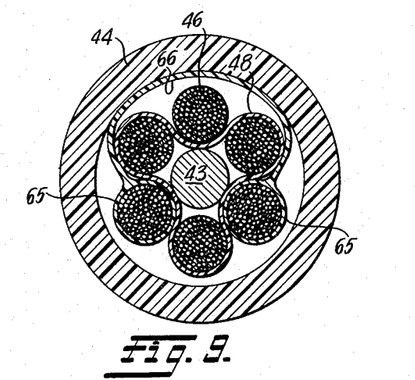
FIG. 9 is a vertical sectional view taken substantially on line 9—9 of FIG. 5.
Figure 10:
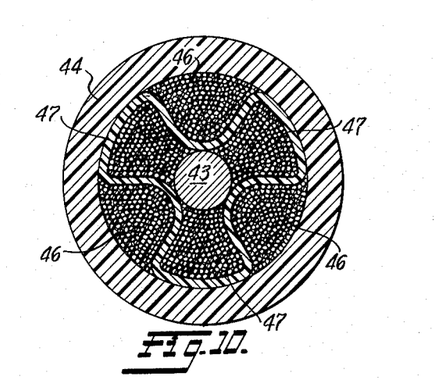
FIG. 10 is a vertical sectional view taken substantially on line 10—10 of FIG. 5.

The tongue embodiment of FIG. 10 illustrates how the tongue embodiment of FIG. 9 may be adapted to accommodate a transverse fastener tapered pin 40′ rather than threaded screw fasteners. It is to be borne in mind that the particular fastener means shown and described in each instance is for illustrative purposes only and that any suitable mechanical fastener means could be used to retain the conductor cable end fitting in rigid assembled, electrically conductive relation to tongue element 30.

The terminal 10 of this invention is particularly adapted to be used with a welding current power supply conductor cable of kickless type wherein is utilized alternate helical windings of two groups of multiple conductors, the conductors in each group being of like polarity, separated by a resilient inner insulation sheath and encased within a resilient outer protective and non-conductive sheath. If the cable is fluid cooled as is the normal case with high amperage, low voltage welding applications for which the present invention is particularly intended, fluid is circulated through the inner and outer sheaths with the fluid connections to the cable usually incorporated in the terminal structure.

In normal practice, when the cable is attached to a terminal unit such as the type herein described, the conductors of like polarity are attached to respective terminal conductors in electrically conductive relation. In prior embodiments, as pointed out earlier, the individual conductors of each group of windings of the cable were attached directly and separately to the terminal conductors by means of fused material, with all the disadvantages pointed out being inherent in such a manner of connection.

The present invention provides a novel, structurally sound, highly practical and electrically efficient means for connecting the cable conductors to the terminal conductors, and utilizes cable conductor end fittings which serve as a mechanical attaching means for removably joining as a unit the conductors of like polarity of each group of windings of the cable to each of the conductors of the terminal, and which furthermore provide a mechanical cable conductor terminal attaching means which allow full unimpeded flow of current through the cable to terminal connection.

Accordingly, as seen in FIGS. 2, 4 and 5, a "kickless" cable conductor structure generally indicated by 45 is seen to comprise two alternate helically wound groups of multiple conductors 46 and 47, each group being of the same polarity and insulated from each other by means of an inner resilient sheath 48 which encloses one set of conductors 47 wound about a central resilient, non-conductive core 43. The outer set of conductors 46 are enclosed by a protective and containing sheath 44 which is frictionally secured to the hose barbs 19 of the terminal unit and retained in position by clamping means 69. If the cable is to be fluid cooled as in the preferred embodiment, the free projecting end of proportioning tube 28 extends within inner sheath 48 of the cable with the end of inner core 43 being disposed adjacent the extreme free end of the tube 28. Each end of the sheath 48 is bound to the lead conductor end fittings 50 while encasing the proportioning tube 28 with numerous wraps of water-proof cord 68. Thus fluid entering the terminal inner chamber 25 through ports 26 will pass both through the tube 28 and into the sheath 48 through apertures 27 and the free end of tube 28, and also through chamber 25 past the outer diameter of tube 28 around the tongues 30, and into outer sheath 44. Fluid leaving the terminal flows in exactly the reverse pattern. The proximity of core 43 to the end of tube 28 insures that fluid flow from chamber 25 will be proportioned between the inner and outer insulating sheaths rather than flowing fully through the tube 28 and directly into or out of the sheath 48.

Figure 8:
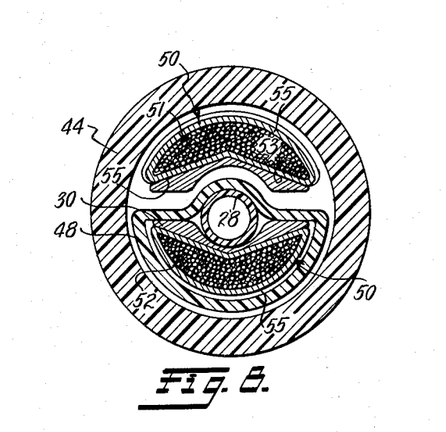
FIG. 8 is a vertical sectional view taken substantially on the line 8—8 of FIG. 5.

As shown in FIGS. 2, 3 and 11, 13 and 14, tying together as a conductive unit the terminal end portions of each group of conductors 46 and 47 of like polarity is a cable conductor end fitting 50. Each conductor end fitting 50 is formed of a conductive metal sheath material adapted to be swaged over the end portions 51 and 52 of the conductors 46 and 47 by a suitable mechanical process whereby the sheath-like end fitting and the conductors enclosed thereby are formed to a generally arcuate configuration. Fitting 50 is furthermore provided with a deformed radial offset as at 54 for positively crimping and retaining the end portions 51 and 52 of the cable conductors 46 and 47 within the fitting 50. It is to be noted that as seen in FIG. 8, the end portions 51 and 52 of the conductors 46 and 47 are formed as a unitary, dense, highly conductive mass wherein the individual conductor rope forms are substantially united as a solid, yet not integral, mass of conductor material. It is preferred, although not necessary by any means, that a solid conductive insert element 56 as shown in FIGS. 4, 5 and 7 be provided within the end fitting 50, which insert is formed to the general shape of the end fitting 50 by the swaging process, and which is preferably of the same conductive material as fitting 50.

Considering the cable conductor end fittings 50 in general, it will be noted that in each embodiment illustrated, the end fitting 50 is formed so as to include a terminal tongue contacting inner surface 53 which conforms substantially with the surface 34 of each tongue element 30 with which it is adapted to cooperate. Moreover, the cross-sectional form of each end fitting 50 as seen in a radial plane is so proportioned with respect to each conductor 12 and tongue element 30, that when each of the end fittings 50 is attached to the tongue element 30 with which it is adapted to cooperate, the combined thickness of the fitting and enclosed cable conductor, and of the terminal tongue element will correspond substantially to the thickness of each terminal conductor element 12 adjacent the tongue portion 30 as seen in FIG. 5. Moreover, the forward end of each end fitting and insert assembly, if an insert is used, is formed by the swaging process so as to present a planar forward face 60 as also seen in FIG. 5 which substantially corresponds in cross-sectional form to the planar radial face 33 of each conductor 12. Each cable conductor end fitting 50 may be provided at its cable conductor receiving end with a generous tapered and flared portion 61. The tapered flared portion 61 of fitting 50 is of important structural and functional significance in this invention. As stated at the outset, cable conductors attached to terminals of the present type have a tendency to fail in the immediate area of the cable to terminal connection. Oftentimes, this failure can be attributed in large measure to the repeated subjection of the cable conductors to severe bending stresses in this area since the cables are acutely bent just beyond the attaching point to the welding gun, when the operator manipulates or positions the weld gun in order to perform the weld on surfaces that are difficult to reach.

Accordingly, it is a feature of this invention that each of the cable conductor end fittings 50 may be formed so as to have a generous flare 61 at its cable conductor receiving end for the purpose of minimizing concentration of any bending stresses in the cable conductor strands in the immediate area of the cable to terminal connection. Thus, if relatively severe bending of the cable should occur at the cable end of the terminal of this invention, the individual conductors of the cable will tend to be bent gradually over the flared end 61 of the end fitting 50, thereby distributing bending stresses uniformly over an area of cable conductor rather than in a localized point as could otherwise occur. To further offset failure of the cable assembly in the terminal to cable joint area, as seen in FIG. 5, the rearward portion 55' of the cable conductor end fittings 50 extends rearwardly from the rearward extremity of the terminal conductor elements 12 to reinforce the joint area. The outer surface of the rearward portion 55' of the end fitting 50, of course, is contoured to the same essential curvature as the terminal conductor elements 12.

In each embodiment, end fitting 50 is provided with a suitable fastener receiving aperture 57 as shown in FIGS. 2, 3 and 13, or a tapered aperture 57' shown in FIGS. 11 and 14, the form of aperture depending upon the type of mechanical fastener desired to be used and/or the particular embodiment of end fitting used.

Considering the cable conductor end fitting embodiment as shown in FIGS. 1–3, the preferred embodiment, inner conductor tongue contacting surface 53 of each of the end fittings 50 is formed to correspond and mate with surface 34 of each of the tongue elements 30, and the forward end 60 of end fitting 50 is formed to correspond and mate with planar radial surface 33 of each conductor 12. In this instance the outer surface 55 of end fitting 50 is arcuate in form, and corresponds in curvature to the outer curvature of terminal conductor 12. In assembling the end fitting 50 to the conductor in this instance the fitting 50 is placed over the tongue portion 30 so that the planar surfaces 33 and 60 abut as shown in FIGS. 4 and 5, and is secured in this position to the conductor tongue by means of suitable fasteners such as threaded screws 40 which extend through the apertures 57 in fitting 50 and the insert 56 (or cable conductor material if insert 56 is note used) and engage fastener securing apertures 39 in tongue 30 which are threaded to accommodate the fastener 40.

Figure 12:
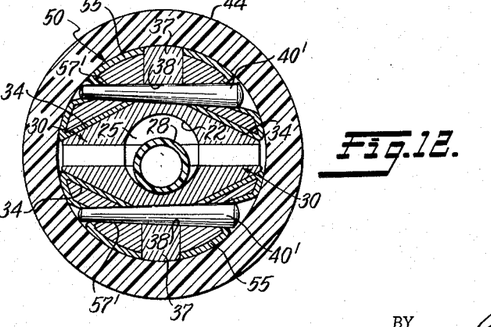
FIG. 12 is an enlarged vertical sectional view similar to FIG. 7 taken substantially on the line 12—12 of FIG. 11 but illustrating the end fitting and terminal tongue in assembled relation within an insulating sheath.

In the embodiment of FIG. 11, the cable conductor end fitting 50 likewise includes an inner tongue contacting surface 53 corresponding in form to outer surface 34 of a tongue element 30 of a conductor 12, and a forward end 60 corresponding in form to the divided radial surface 33 of the conductor 12. In this instance the end fitting 50 and the insert 56 (or conductor material 52 within the fitting if insert 56 is not used) is bifurcated to provide a sot or cut out section 37' whereby the end fitting 50 is bifurcated and is adapted to accommodate the thickened radial section 37 on tongue 30 when the end fitting 50 is attached to the terminal conductor. A transverse aperture 57' is provided in the cable conductor end fitting 50. In this instance the cable conductor end fitting 50 is fitted to the terminal conductor 12 in such a manner that inner surface 53 of the fitting 50 mates with outer surface 34 of the tongue 30, and the planar forward face 60 of fitting 50 abuts planar face 33 of terminal conductor 12. Radial section 37 of course will be interlocked within cut out section 37' of fitting 50 as seen in FIG. 12, and the combined arcuate outer surface 55 of the fitting 50 and 41 of radial section 37 will form a smooth outer contour corresponding in curvature to the peripheral curvature of conductor 12. Tapered pin fastener 40' is inserted transversely through the aligned apertures 57' in the end fitting 50 and 38 in the radial section 37 of tongue 30 to maintain the end fitting 50 in closely fitting assembled relation to terminal conductor 12.

In the embodiment of FIG. 13, the surface 55 of end fitting 50 corresponds in form to the end fitting surface 34' of cylindrical tongue portion 30 of conductor 12, and the fastener receiving apertures 57 provided in the end fitting 50, are threaded. In assembling the end fitting 50 of this embodiment to the form of terminal conductor 12 illustrated in FIG. 13, the end fitting 50 is placed within the tongue section 30 so that the surface 53' mates with the surface 34' of the tongue, and so that end 60 of fitting 50 abuts surface 33 of conductor 12. The end fitting is secured in this position by means of screw fasteners 40 which extend through the tongue portion 30 of conductor 12 and into threaded apertures 57 in end fitting 50.

In the embodiment of FIG. 14, end fitting 50 corresponds in form to that of the FIG. 13 embodiment, except that a transverse aperture 57' is provided therein to accommodate a tapered pin fastener 40' for securing the end fitting 50 in the terminal conductor tongue 30 in the manner of the FIG. 11 configuration.

When the cable conductors are secured to the terminal unit by means of the end fitting as above described, the outer sheath 44 of cable 45 may be brought over the cable end of the terminal and secured to the hose barbs 19 provided therein. Coolant may then be introduced to the cable for circulating therethrough, as described above.

When assembled, the forward ends 60 of the cable conductor end fittings 50 abut directly against the radial surfaces 33 of the conductors 12 and the mutual interfaces of the fittings 50 and tongues 30 mate securely together in close conformity. This is necessary so that resistance or impedance to current flow through the cable and terminal is kept at a minimum at the cable to terminal connection.

Since the conductors of like polarity are all brought together at a common point at the fitting, it is also desirable to provide in this invention some means for separating the individual conductors in the outer group 46 from each other in the immediate area adjacent the fitting 50 to minimize wear on the outer cable conductor in this area, and to maintain the turns of the individual outer conductors of the cable in helical form as close to the terminal as possible, since otherwise in use the cable conductors would tend to gradually group together along the cable starting at the terminal.

Accordingly, as shown in FIGS. 2, 4, 5 and 9, there are provided non-conductive ferrules 65 connected by a tensioned, resilient non-conductive band 66. The ferrules 65 are disposed on two of the outer conductors 46 and serve to maintain these spaced apart from a third conductor. Any tendency of the two cables attached to the ferrules to approach the third cable which they are normally inclined to do is thus resisted by the tensioned band 66.

It is desired to point out that when the cable is attached to the terminal by means of the conductor end fittings 50, the terminal end of the inner sheath 48 is attached to the terminal at a point directly behind the radial offset area 54 of fitting 50 as seen in FIG. 2 and thus by reason of the offset there is provided a smooth outer contour over which the outer sheath 44 may fit. It is to be noted that the position and relative rigidity of the proportioner tube 28 serves to reinforce the cable against bending stresses in the cable attaching area of the fluid cooled terminal unit of this invention.

Although the description has been confined to a mechanical joint connection between cable conductor lead ends and the terminal, utilizing only mechanical fasteners, it must be noted that the joint can also be secured by flowing solder between the mating surfaces of the conductor end fittings and the terminal and eliminating any need for mechanical fastening devices. Further, it is to be understood that the concurrent utilization of both the mechanical fastening devices and the solder fusing of the lead ends to the terminal is also possible with any of the disclosed embodiments and should be considered as part of this disclosure.

I claim:

1. A flexible electrical welding cable assembly comprising two mutually insulated groups of cable conductors, each group of conductors being of single polarity and having free end portions; end fittings enclosing the said free end portions of each of said groups of cable conductors to form a unitary point of termination for the cable conductors within each of said groups; terminal elements at each end of said cable assembly, said terminal elements each comprising a pair of elongated, semicylindrical terminal conductor elements joined along inner, flat, mutually insulated, contiguous surfaces, each of said terminal conductor elements having a rearward portion; tongue projections extending axially rearwardly from the said rearward portions of said terminal conductor elements, said tongue projections being integral with, of radial thickness less than, and of similar width as the said terminal conductor elements, said tongue projections having outer surfaces meeting the rearward portion of said terminal conductor elements along radial, substantially planar surfaces; said cable conductor end fittings having arcuate outer surfaces similar in curvature to the outer surfaces of said terminal conductor elements, inner surfaces of such form that they may closely fit against the said outer surfaces of said tongue projections, and substantially planar forward surfaces; each of said groups of cable conductors of like polarity being secured at its opposite ends to a terminal conductor element of similar polarity by means of said cable conductor end fittings; each end fitting being secured to a terminal conductor tongue projection by means of removable mechanical fastener means, the said inner and forward surfaces of said end fittings abutting respectively the said outer surfaces of said tongue projection and the said radial surfaces of said terminal conductor elements in electrically conductive relationship, and the radial thickness of said end fittings being such that when secured to said tongue projections, the outer surface of each of said end fittings forms substantially a continuation of the outer arcuate surface of the respective terminal conductor element to which it is secured, whereby a smooth, uniform, low resistance cable to terminal joint is obtained; and a tubular, removable, resilient sheath enclosing said cable conductors and extending over the rearward portion of each of said terminal elements at opposite ends of said cable assembly so as to also enclose the cable to terminal joints.

2. The welding cable assembly recited in claim 1 wherein each of said terminal elements includes means for circulating cooling water therethrough including an internal coolant carrying tube disposed along the central axis of each of said terminal elements, said tube having a portion thereof extending axially rearwardly from between the said tongue projections at the rearward portion of each of said terminal elements; said terminal conductor elements including internal grooves along the joined flat inner sides thereof for accommodating said tube; and wherein the outer surface of each of said tongue projections comprises a pair of apexed, substantially planar, surfaces meeting along a line parallel to but spaced radially outwardly from the axis of said cooling tube whereby the structural integrity of said tongue projection of each of said terminal conductor elements is maintained and maximum surface area for electrical conductivity is presented for receiving said cable conductor end fittings thereon.

3. The welding cable assembly recited in claim 1 wherein said end fittings include rearward portions enclosing said free end portions of said cable conductors, said rearward portions extending axially rearwardly from the rearward extremity of said terminal conductor elements when the said end fittings are attached thereto, said rearward portions being generally arcuate in form with substantially the same outer curvature as the terminal conductor elements, whereby the terminal to cable joint is reinforced in this area.

4. A flexible electric welding cable assembly comprising two mutually insulated groups of cable conductors, each group of conductors being of single polarity and having free end portions; end fittings enclosing the free end portions of each of said groups of cable conductors to form a unitary point of termination for the cable conductors within each of said groups; terminal elements at each end of said cable assembly, said terminal elements each comprising a pair of elongated, semicyclindrical terminal conductor elements joined along inner, flat, mutually insulated, contiguous surfaces, each of said terminal conductor elements having a rearward portion; tongue projections extending axially rearwardly from the said rearward portions of said conductor elements, said tongue projections being integral with said terminal conductor elements and being generally Y-shaped, with the branches of said Y being towards the said flat inner surfaces of said terminal conductor elements, and the single leg of said Y being centrally and radially disposed relative to said terminal conductor elements; said tongue projections meeting the rearward portion of said terminal conductor elements along radial, substantially planar surfaces of said terminal conductor elements; said cable conductor end fittings having inner surfaces, planar forward surfaces, and arcuate outer surfaces similar in curvature to the outer surfaces of said terminal conductor elements, said end fittings being bifurcated and formed at their forward portions so as to closely fit upon said Y-shaped tongue projections; each of said groups of cable conductors of like polarity being secured at its opposite ends to a terminal conductor element of similar polarity by means of said cable conductor end fittings, each end fitting being secured in electrically conducting relationship to a respective tongue projection of a terminal conductor element by means of a transversely extending removable fastener means, with the said inner surfaces of said end fittings being in electrical contact with the said tongue projection and the said forward surfaces thereof being in electrical contact with the said radial surfaces of said terminal conductor elements; the radial thickness of said end fittings being such that when secured to said tongue projections, the outer surface of each of said end fittings forms substantially a continuation of the outer arcuate surface of the respective terminal conductor element to which it is attached, whereby a smooth, uniform, low resistance cable to terminal joint is obtained; and a tubular, removable resilient sheath enclosing said cable conductors and extending over the rearward portion of each of said terminal elements at opposite ends of said cable assembly so as to enclose the cable to terminal joints.

5. A flexible electric welding cable assembly comprising two mutually insulated groups of cable conductors, each of said groups being of single polarity and terminating in unitary cable conductor end fittings; terminal elements at each end of said cable assembly, said terminal elements each comprising a pair of elongated, semicylindrical terminal conductor elements joined along flat, mutually insulated, contiguous surfaces, each of said terminal conductor elements having its rearward portion undercut radially outwardly from its internal flat surface so as to leave a relatively thin outer cylindrical wall section of said terminal conductor element extending axially from substantially planar, radial surfaces of said terminal conductor elements; said cylindrical wall section having an arcuate inner surface; each of said cable conductor end fittings having a planar forward surface and an outer surface contoured to match the arcuate inner surface of said cylindrical wall sections; each of said end fittings being secured in electrically conductive relationship to the undercut rearward portion of a terminal conductor element by means of a removable, mechanical fastener means, with the said outer surfaces of said end fittings abutting the said inner surfaces of said axially projecting cylindrical wall sections of said terminal conductors and with the said forward surface of said end fittings abutting the said radial surfaces of said terminal conductors; and a tubular removable outer resilient sheath enclosing said cable conductors and extending over the rearward portions of each of said terminal elements.

References Cited in the file of this patent
UNITED STATES PATENTS

| | | |
|---|---|---|
| 2,222,609 | Everett | Nov. 26, 1840 |
| 2,835,721 | Leathers | May 20, 1958 |
| 3,021,380 | Barrass | Feb. 13, 1962 |